United States Patent [19]

Eberhardt et al.

[11] Patent Number: 4,761,957
[45] Date of Patent: Aug. 9, 1988

[54] INDIRECTLY HEATED GAS TURBINE ENGINE

[75] Inventors: John D. Eberhardt; Peter L. Hovde; John M. Koerber; Robert J. Neary; Robert V. Peltier, all of San Diego, Calif.

[73] Assignee: Solar Turbines Incorporated, San Diego, Calif.

[21] Appl. No.: 790,105

[22] Filed: Oct. 22, 1985

Related U.S. Application Data

[63] Continuation of Ser. No. 471,126, Mar. 1, 1983, abandoned.

[51] Int. Cl.⁴ .................................................. F02C 1/04
[52] U.S. Cl. .......................................... 60/650; 60/664; 60/682
[58] Field of Search ........................... 60/650, 682, 664

[56] References Cited

U.S. PATENT DOCUMENTS

| | | | |
|---|---|---|---|
| 2,731,798 | 1/1956 | Welsh et al. | 60/650 |
| 2,872,786 | 2/1959 | Ergenc | 60/682 |
| 3,276,674 | 10/1966 | Hens | 415/26 X |
| 3,362,626 | 1/1968 | Schlirf | 415/26 X |
| 3,473,331 | 10/1969 | Fernandes | 60/682 X |
| 3,630,022 | 9/1969 | Jubb | 60/650 X |
| 3,864,919 | 2/1975 | Frutschi | 60/682 X |
| 4,193,266 | 3/1980 | Frutschi | 60/650 X |

Primary Examiner—Allen M. Ostrager
Attorney, Agent, or Firm—Hughes, Cassidy & Multer

[57] ABSTRACT

Indirectly fired gas turbine engine systems which can be operated on alternative or renewable fuels or by waste heat. Fast response time over the entire operating range of the engine, precise control over turbine inlet temperature, and water injection for increased power output are featured as are arrangements for dumping air and thereby preventing mechanical damage when rapid deceleration occurs or the load is lost. Other mechanical innovations facilitate start-up and shut-down of the turbine engine; make preheated process air available; and provide precise control over the thermal energy supplied to the heat exchanger in which compressor discharge air is heated.

2 Claims, 1 Drawing Sheet

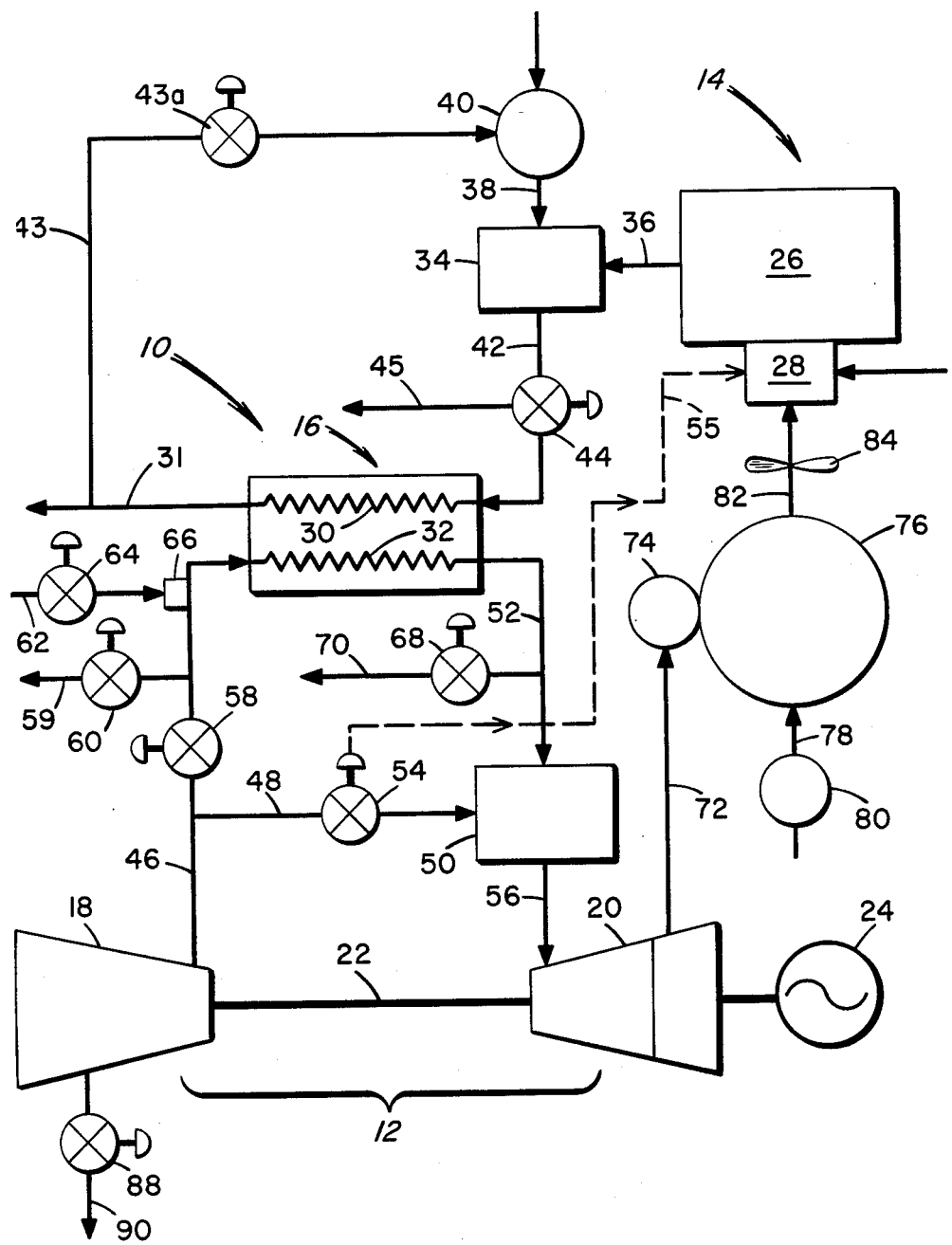

INDIRECTLY HEATED GAS TURBINE ENGINE

CROSS REFERENCE TO RELATED APPLICATION

This application is a continuation of application Ser. No. 471,126 filed Mar. 1, 1983, by John D. Eberhardt et al. (now abandoned).

TECHNICAL FIELD OF THE INVENTION

The present invention relates to gas turbine engines and, more specifically, to novel, improved systems having gas turbine engines which can be operated on alternative or renewable fuels or by waste heat.

BACKGROUND OF THE INVENTION

High energy costs and continuing emphasis on the conservation of irreplaceable energy sources such as petroleum have spurred many efforts to develop viable alternatives to conventional internal combustion engines of the reciprocating and rotary types. One avenue which has been explored is the development of indirectly fired gas turbine engines. In these the gas or liquid fuel fired, internal combustor conventionally employed to produce hot gases to drive a turbine is replaced by an external heat source. This may be an external combustor operated on an alternative fuel such as coal or a renewable fuel such as wood-waste products, or the heat may be recovered from an industrial or other process in circumstances in which it would otherwise be wasted.

In any case, the hot gases available from the external heat source are circulated through an appropriate heat exchanger in heat transfer relationship to air discharged from the compressor of the gas turbine engine. This heats the air which is then circulated to the turbine of the engine to drive the latter.

A number of indirectly fired gas turbine engines have heretofore been suggested as shown by U.S. Pat. Nos. 2,677,236 issued May 4, 1954, to Grinstad; 3,321,930 issued May 30, 1967, to LaFleur; 3,864,919 issued Feb. 11, 1975, to Frutschi; 3,868,818 issued Mar. 4, 1975 to Itoh; and 3,932,996 issued Jan. 20, 1976, to Bammert et al.

DISCLOSURE OF THE INVENTION

The novel, indirectly fired gas turbine engine systems disclosed herein differ from those described in the foregoing patents and elsewhere in the prior art in several important respects.

One is the provision of a fast-acting bypass trim valve arrangement for controlling the inlet temperature of the hot gases supplied to the turbine of the engine as a motive fluid. The trim valve arrangement is particularly important in indirectly fired single-shaft engines because turbine inlet temperature is the only independent variable for controlling engine speed above idle.

Another salient feature of the novel, indirectly fired gas turbine engine systems disclosed herein is a fully modulating pressure drop control valve located in the compressor discharge duct downstream of the bypass duct in which the trim valve is installed. This valve allows efficient control of turbine inlet temperature to be obtained over the entire operating range of the gas turbine engine.

Yet another important feature of the disclosed systems is an arrangement for injecting water into the compressor discharge air at a location downstream of the pressure drop control valve and the bypass duct. This technique can be employed to substantially increase the power available from the external heat source.

Still another feature of the systems disclosed herein is a dump valve, also in the compressor discharge duct, on the downstream side of the pressure drop control valve. Large volumes of high pressure air are trapped between the compressor outlet and the turbine inlet in the engines disclosed herein. This pressure must be discharged in a fraction of a second when rapid deceleration of the engine occurs. This criterion is fulfilled by the compressor discharge duct dump valve just described.

In addition, a turbine dump valve or rupture diaphragm may optionally be located between the discharge side of the heat exchanger in which the compressor discharge air is heated and a turbine inlet mixer where the heated air discharged from the heat exchanger is mixed with air from the compressor discharge bypass duct to make air available to the turbine of the engine at the selected turbine inlet temperature. The turbine dump valve or rupture diaphragm is operated if there is a sudden loss of load to prevent engine overspeed by dumping the high pressure heated air with its large amounts of stored energy. Typically, the turbine dump valve will not be required for a power plant utilizing a single-shaft engine but will be mandatory if a two-shaft engine is employed.

Preferably, a bleed valve will be provided after one of the later compressor stages in a turbine engine of the type disclosed herein. Bleeding of air from the compressor can be employed to advantage during start-up of the engine to avoid compressor surge and to improve compressor efficiency by eliminating compressor choke and stall.

It is also preferred that the turbine exhaust be routed through a backflow prevention damper into a buffer plenum. Provision is also made for supplying ambient air to the buffer plenum during shutdown of the turbine engine. An induction fan may also be provided. This fan can be employed to effect a flow of ambient air into the buffer plenum during turbine engine shutdown to supply preheated combustion air to an external burner or burners from the turbine exhaust duct during operation of the gas turbine engine.

In preferred embodiments of the invention, provision is also made for modulating the amount of heat supplied to that heat exchanger in which the compressor discharge air is heated. This can be accomplished by a mixer for blending controlled amounts of ambient temperature air with the hot gases available from the external heat source and by a diverter valve downstream from the mixer for regulating the flow of hot gases through the heat exchanger.

OBJECTS OF THE INVENTION

From the foregoing, it will be apparent to the reader that one primary object of the present invention resides in the provision of novel, improved, indirectly fired gas turbine engine power plants which can be operated on alternative or renewable fuels or by waste heat.

Other also important but more specific objects of the invention reside in the provision of gas turbine engine power plants in accord with the preceding object:

in which provision is made for accurately controlling the temperature of the hot gases supplied to the turbine of the engine;

in which the hot air supplied to the turbine of the engine has a uniform temperature profile;

in which efficient control of the turbine inlet temperature can be obtained over the entire operating range of the engine;

in which provision is made for increasing the power output of the turbine by injecting water into the air discharged from the compressor of the engine;

in which provision is made for dumping air from the compressor discharge duct when rapid deceleration of the engine occurs;

in which provision is made for preventing engine overspeed if there is a sudden loss of load by dumping high temperature air otherwise supplied to the turbine of the engine;

in which provision is made for bleeding air from the turbine engine compressor during start-up of the engine to avoid compressor surge and to improve compressor efficiency;

in which a buffer plenum arrangement is employed to facilitate shutdown of the turbine engine and/or to accomplish that objective and to supply preheated combustion air to an external combustor from the turbine of the engine during power plant operation;

in which provision is made for modulating the amount of heat supplied from the external heat source to the heat exchanger in which the compressor discharge air is heated.

Other important objects and features and additional advantages of the invention will become apparent from the foregoing, the appended claims and the ensuing detailed description and discussion of a preferred embodiment of the invention taken in conjunction with the accompanying drawing.

THE DRAWING

The single FIGURE is a schematic illustration of an indirectly fired gas turbine engine system embodying the principles of the present invention.

A PREFERRED EMBODIMENT OF THE INVENTION

Referring now to the drawing, the single FIGURE schematically depicts an indirectly fired gas turbine engine system 10 constructed in accord with and embodying the principles of the present invention.

The major components of system 10 include a gas turbine engine 12; an external heat source 14; and a heat exchanger 16 in which thermal energy made available from external heat source 14 is transferred to the motive fluid on which turbine engine 12 is operated.

Turbine engine 12 may be of either two- or single-shaft configuration. In both cases engine 12 includes a compressor 18 and a turbine 20. The compressor may be, for example, the eight-stage axial flow compressor employed in the SATURN gas turbine engine manufactured by Solar Turbines Incorporated, San Diego, Calif.; and turbine 20 may be of the type employed in that engine.

In the operation of the illustrated single-shaft engine, air discharged from compressor 18 is heated in heat exchanger 16 and then expanded through turbine 20. Part of the energy thus developed in that turbine is utilized to drive compressor 18 which is drive connected to the turbine by shaft 22. The remainder of the energy is employed to drive a load which, in the illustrated embodiment of the invention, is an alternator 24.

Typically, turbines of the character just described are equipped with an internal combustor, operated on a gas or liquid fuel, for heating the air discharged from the turbine engine compressor. The heated air and combustion products are then expanded through the turbine of the engine to drive the latter.

As discussed above, turbine engine 12 differs from one of conventional construction in that the compressor discharge air is heated by an external heat source rather than by an internal combustor. This external heat source may be, for example, a combustor fired by an alternate fuel such as coal or a renewable fuel such as wood waste. Or, as shown in the drawing, the external heat source may be a furnace 26 in which heat is generated by a combustor 28. Heat from the furnace which would otherwise be wasted is recovered and utilized to heat the air discharged from turbine engine compressor 18 in heat exchanger 16.

The latter component is of conventional gas-to-gas configuration with the hot gases available from furnace 26 being circulated through the heat exchanger in a circuit 30 and then discharged through a duct 31. Thermal energy in those gases is transferred to compressor discharge air flowing through the heat exchanger in a separate circuit 32.

As discussed above, provision is preferably made for controlling the temperature and volume of the hot gases supplied to heat exchanger 16 from external heat source 14. To this end, the hot gases are circulated from the external heat source to a mixer 34 through a duct 36. In the mixer, ambient air supplied to it through a duct 38 is mixed with the hot gases to control the temperature of the latter. A conventional temperature responsive controller 40 in duct 38 modulates the flow of ambient air to mixer 34, and the gases discharged from the mixer flow through duct 42 to heat exchanger 16.

Additional waste heat can be recovered by circulating hot gases from heat exchanger discharge duct 31 to mixer 34 through duct 43, and these gases can also be utilized to control the temperature of the gases circulated through duct 42 to heat exchanger 16, the mass flow of gases through duct 43 being modulated for this purpose by valve 43a. This arrangement is a thermodynamic alternative (or supplement) to the introduction of ambient air into the mixer through duct 38.

A modulating type diverter valve 44 allows hot gases to be vented from duct 42 through duct 45 to atmosphere or a process to control the volume of hot gases supplied to heat exchanger 16.

The controls just described are employed primarily during start-up and shut-down of gas turbine engine 12 to control the heat input to turbine 20. However, they can also be utilized during steady state operation of the turbine engine to make adjustments in the energy input to the turbine.

Referring again to the drawing, the air from the compressor 18 of gas turbine engine 12 is circulated to the high pressure circuit 32 in heat exchanger 16 through a compressor discharge duct 46. The compressor discharge duct is also connected, via a bypass duct 48, to a second mixer 50. Compressor discharge air heated in heat exchanger 16 is also circulated to the mixer, in this case through a heat exchanger discharge duct 52. The two streams of gases are combined in mixer 50 to produce a single stream of air at a controlled temperature for operating turbine 20. Mixer 50 may be of any desired construction as long as it is capable of producing a gas stream with a uniform temperature profile.

Control over the proportion of the compressor discharge air diverted through duct 48 directly into mixer 50 is afforded by a modulating type trim valve 54 in bypass duct 48.

The arrangement just described is employed to provide fast-reacting control over the operation of gas turbine engine 12. Specifically, in a single-shaft engine such as is shown in the drawing, turbine inlet temperature is the only variable available above engine idle speed by which the operation of the engine can be controlled. It is impractical to control this variable in heat exchanger 16 as the response time of the latter will typically be on the order of five minutes. By bypassing the heat exchanger, however, and ducting low temperature compressor discharge air to mixer 50, the temperature of the air discharged from the latter through duct 56 to turbine 20 can be altered in a period of time approaching the response time of a conventional gas turbine engine fuel control and combustion system.

Under transient conditions, the air circulated to mixer 50 through duct 48 may actually have a higher temperature than that circulated through heat exchanger 16. Nevertheless, in this case also, the proportioning of the two air streams by bypass trim valve 54 can be employed to control the temperature of the gases supplied to turbine 20.

Preferably, a signal taken from the controller of valve 54 as indicated by line 55 is used to reduce the flow of fuel to combustor 28 whenever valve 54 is open to more than a preassigned, scheduled extent. The efficiency of the illustrated system decreases as valve 54 is opened. By reducing the fuel input to combustor 28, valve 54 is kept closed to the maximum extent and as much as possible, thereby maximizing the efficiency of the system as well as reducing fuel consumption.

A fully modulating pressure drop control valve 58 is preferably located in compressor discharge duct 46 on the downstream side of bypass duct 48. Absent the pressure drop control valve, the effect of opening bypass trim valve 54 by a large amount would be a rapid drop in the overall pressure difference between compressor 18 and turbine 20. This means that a very large and expensive bypass trim valve would be required to permit substantial reductions in turbine inlet temperature because of the large volumes of air that would have to be handled due to the rapid decrease in pressure difference across the valve that would occur when the trim valve was opened. Furthermore, accurate turbine temperature inlet control would be difficult under operating conditions in which bypass valve 54 is open to only a small extent; and fast valve response would be difficult to achieve.

Pressure drop control valve 58 eliminates these problems by opening and closing as necessary to maintain a constant (or scheduled) pressure drop between turbine 18 and compressor 20 irrespective of the degree to which trim valve 54 may be open. This valve therefore promotes the flow of compressor discharge air through duct 48 by maintaining a higher pressure difference between the compressor and turbine than would be possible if it were not employed. As a result, a significantly smaller and less expensive bypass trim valve can be employed; and a faster control response can be obtained.

Also located in compressor discharge duct 46, on the downstream side of pressure drop control valve 58 and in vent duct 59, is a dump or relief valve 60 which is opened in response to a control system command. Circumstances such as the presence of an excessive load on the turbine or malfunction of a control valve can result in rapid deceleration of gas turbine engine 12. A large volume of high pressure discharge air is present in heat exchanger 16 and in the ducting between that component and the compressor and turbine of gas turbine engine 12 during operation of the latter. During rapid deceleration of the engine, the compressor speed may drop so rapidly that the pressure on this air will exceed the surge limit of the compressor. This is to be avoided as surge can mechanically damage the compressor. By scheduling relief valve 60 to open at a pressure below the surge limit, surge and its undesirable effects can, however, be avoided by dumping sufficient air through duct 59 to keep the pressure on the air below the selected limit.

Communicating with compressor discharge duct 46 on the downstream side of relief valve 60 is a water supply line 62 equipped with a flow control valve 64 and terminating in an injector 66 of conventional configuration.

This arrangement is employed to inject water into the compressor discharge air before that air reaches heat exchanger 16. As discussed above, the injection of water into the compressor discharge air makes it possible to increase the power developed by gas turbine engine 12 by increasing the mass flow of fluid through heat exchanger 16. The amount of water employed for this purpose will typically be approximately four percent based on the weight of the air to which it is added although higher amounts can be employed. Injection of water in the preferred amounts will typically result in power increases in the range of 15–25%.

Another optional component of gas turbine engine system 10 is a turbine relief valve 68 in a vent duct 70 communicating with heat exchanger discharge duct 52 (a rupture diaphragm rather than a valve can be employed, if desired).

Valve 68 is designed to open in the event of a sudden loss of the load on turbine engine 12. This avoids turbine overspeed by dumping air present in heat exchanger circuit 32 and heat exchanger discharge duct 52, thereby keeping the energy stored in that air from reaching turbine 20. The turbine dump valve nay not be required for single-shaft turbine engines but will typically be mandatory for two-shaft engines.

Air discharged from turbine 20 is circulated through a turbine discharge duct 72 and a back flow prevention damper 74 to a buffer plenum 76. Ambient air can be admitted to the buffer plenum through an inlet duct 78 at a rate determined by flow controller 80.

In the exemplary, illustrated embodiment of the invention, buffer plenum 76 is connected to the combustor 28 of external heat source 14 by duct 82 to supply preheated combustion air to the combustor. An induction fan 84 in duct 82 promotes the flow of combustion air from buffer plenum 76 to the combustor.

Buffer plenum 76 is also employed to vent turbine discharge air in excess of that required by external heat source 14. It additionally allows air to be aspirated from atmospheric or other sources when the turbine discharge air is not sufficient to meet the demands of the external heat source; for example, if turbine engine 12 is shut down and not operating.

With damper 74 closed, air will be delivered from the alternate source to external heat source 14. With the damper open, and the turbine exhaust air exceeding that required by the external heat source, excess air will be vented from the buffer plenum. If damper 74 is open, and the turbine exhaust air supply insufficient, air will be drawn from both turbine 20 and the alternate source to meet process requirements.

Typically, damper 74 will be closed when gas turbine engine 12 is shut down. That keeps air from being drawn through turbine 20 or from flowing from external heat source 14 back through the turbine. This isolates the turbine from the external heat source and prevents the damage to turbine components which might otherwise occur.

A final feature that can often be employed to advantage in gas turbine engine systems of the type shown in the drawing is a compressor bleed valve. A valve of that character, identified by reference character 88 in the drawing, is located in a bleed air discharge duct 90 which communicates with the interior of compressor 18.

As discussed above, compressor 18 may be of the type employed in the Solar Turbines Incorporated SATURN engine. That compressor is of the axial flow type and has eight stages, and duct 90 is located after the sixth stage. Valve 88 is opened during the start-up of gas turbine engine 12 to avoid engine surge and to improve compressor efficiency by venting air through duct 90. Specifically, during starting, the increase in air density through succeeding stages of compressor 18 is much less than it is when the compressor is operated at its design point. This off-design operation results in the back or downstream stages operating inefficiently in choke and in the front or upstream stages operating inefficiently in stall. By opening bleed valve 88 during start-up, sufficient air is extracted from the compressor to unstall the front stages and unchoke the back stages. This greatly increases compressor efficiency; it also increases the surge limit of the compressor, thereby preventing the compressor from surging as it is accelerated during start-up.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed:

1. A indirectly fired gas turbine engine system comprising: a compressor; an external heat source; a heat exchanger through which air discharged from said compressor can be circulated in heat exchange relationship with gases from said external heat source to heat said air; a turbine through which heated air can be expanded to drive the turbine; a first mixing chamber to which heated air can be circulated from said heat exchanger and from which air can be circulated to said turbine; means including a bypass duct for diverting a modulated proportion of the air discharged from said compressor from the upstream side of said heat exchanger to said mixing chamber for admixture with the air circulated thereto from said heat exchanger to thereby control the temperature of the air circulated to said turbine from said mixing chamber; a compressor discharge duct providing fluid communication between said compressor and said heat exchanger, said compressor duct also communicating with said bypass duct; and means for maintaining a constant or scheduled pressure drop between said compressor and said turbine to provide accurate turbine inlet temperature control and to permit substantial and rapid drops in said turbine inlet temperature, said last-mentioned means comprising a modulating, pressure drop control valve in said compressor duct on the downstream side of said bypass duct and between said compressor duct and said heat exchanger.

2. An indirectly fired gas turbine engine system comprising: a compressor; an external heat source; a heat exchanger through which air discharged from said compressor can be circulated in heat exchange relationship with gases from said external heat source to heat said air; a turbine through which the heated air can be circulated to drive the turbine; duct means providing fluid communication between said compressor and said heat exchanger; dump means in fluid communication with said duct means through which air trapped between the discharge side of the compressor and the inlet side of the turbine can be discharged when a rapid deceleration of said engine occurs; a first mixing chamber to which heated air can be circulated from said heat exchanger and from which air can be circulated to said turbine; means including a bypass duct for diverting a modulated proportion of the air discharged from said compressor from the upstream side of said heat exchanger to said mixing chamber for admixture with the air circulated thereto from said heat exchanger to thereby control the temperature of the air circulated to said turbine from said mixing chamber; a compressor discharge duct providing fluid communication between said cmpressor and said heat exchanger, said compressor discharge duct also communicating with said bypass duct; and means for maintaining a constant or scheduled pressure drop between said compressor and said turbine to provide accurate turbine inlet temperature control and to permit substantial and rapid drops in said turbine inlet temperature, said last-mentioned means comprising a modulating, pressure drop control valve in said compressor duct on the downstream side of said bypass duct and between said compressor duct and said heat exchanger.

* * * * *